(12) United States Patent
Lai

(10) Patent No.: US 9,858,495 B2
(45) Date of Patent: Jan. 2, 2018

(54) WAVELET-BASED IMAGE DECOLORIZATION AND ENHANCEMENT

(71) Applicant: Hong Kong Applied Science and Technology Research Institute Company Limited, Hong Kong (HK)

(72) Inventor: Cheung Ming Lai, Hong Kong (HK)

(73) Assignee: Hong Kong Applied Science and Technology Research, Hong Kong (HK)

( * ) Notice: Subject to any disclaimer, the term of this patent is extended or adjusted under 35 U.S.C. 154(b) by 260 days.

(21) Appl. No.: 14/746,852

(22) Filed: Jun. 23, 2015

(65) Prior Publication Data

US 2016/0379340 A1    Dec. 29, 2016

(51) Int. Cl.

| | | |
|---|---|---|
| *G06K 9/40* | (2006.01) | |
| *G06K 9/46* | (2006.01) | |
| *G06K 9/52* | (2006.01) | |
| *H04N 1/60* | (2006.01) | |
| *H04N 5/208* | (2006.01) | |
| *H04N 9/70* | (2006.01) | |

(52) U.S. Cl.
CPC ......... *G06K 9/4661* (2013.01); *G06K 9/4652* (2013.01); *G06K 9/52* (2013.01); *G06K 9/527* (2013.01); *H04N 1/6058* (2013.01); *H04N 5/208* (2013.01); *H04N 9/70* (2013.01)

(58) Field of Classification Search
USPC ..... 348/222.1, 234; 382/100, 128, 167, 224, 382/240; 702/19; 706/15
See application file for complete search history.

(56) References Cited

U.S. PATENT DOCUMENTS

| | | | |
|---|---|---|---|
| 6,285,992 B1* | 9/2001 | Kwasny | G06K 9/6267 706/15 |
| 6,801,672 B1* | 10/2004 | Thomas | G06T 5/10 382/167 |
| 7,181,042 B2* | 2/2007 | Tian | G06T 1/0028 382/100 |
| 7,761,238 B2* | 7/2010 | Moser | G06F 19/22 702/19 |
| 7,778,484 B2* | 8/2010 | Fu | G06K 9/40 348/234 |
| 8,928,936 B2* | 1/2015 | Hinds | H04N 1/40012 358/1.9 |
| 8,948,503 B2* | 2/2015 | Sugiyama | H04N 9/07 348/222.1 |
| 9,092,893 B2* | 7/2015 | Ubillos | G06F 3/0482 |
| 9,197,902 B2* | 11/2015 | Mazumdar | H04N 19/63 |
| 9,405,731 B2* | 8/2016 | Choudur | H03M 7/30 |

(Continued)

FOREIGN PATENT DOCUMENTS

EP    1615168 A1 *  1/2006  ........... G06T 3/4084

*Primary Examiner* — Xuemei Chen
(74) *Attorney, Agent, or Firm* — Spruson & Ferguson (HK)

(57) ABSTRACT

The present invention relates to image processing. More particularly, the present invention provides methods for efficient image decolorization and color image enhancement. The methods of the present invention comprise decolorization in frequency domain, adaptive brightness control for an enhanced grayscale image and color image enhancement. The present invention is able to improve sharpness and fine details in both enhanced grayscale and color images.

17 Claims, 16 Drawing Sheets

(6 of 16 Drawing Sheet(s) Filed in Color)

(56) References Cited

U.S. PATENT DOCUMENTS

| | | | |
|---|---|---|---|
| 2006/0088219 A1* | 4/2006 | Zhang | G06K 9/00369 382/224 |
| 2007/0263938 A1* | 11/2007 | Lee | H04N 19/14 382/240 |
| 2008/0285868 A1* | 11/2008 | Rai | H04N 19/176 382/240 |
| 2016/0253466 A1* | 9/2016 | Agaian | G06N 3/0427 382/128 |

* cited by examiner

WAVELET-BASED IMAGE DECOLORIZATION AND ENHANCEMENT

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates to image processing. More particularly, the present invention provides methods for image decolorization and color image enhancement.

BACKGROUND

Recently, image decolorization is widely used in various areas such as monochromatic printing, monochromatic medical displays, and pattern recognition. On the other hand, color image enhancement is commonly found in medical image enhancement, defect detection, and visual inspection and interpretation. Such demands in the market push a lot of researchers in image processing devoting to a variety of researches in these application areas.

U.S. Pat. No. 7,151,858 provides an apparatus and a method for correcting the sharpness of an image signal, using a Haar Wavelet transform and a difference between pixel values adjacent to the edge of the image signal to be corrected while reducing the occurrence of overshoot and undershoot at the edge of the image signal. The apparatus includes an edge detector for detecting data on the edge of the image signal, by performing a multi-stage Haar Wavelet transform on the image signal, a gain detector for detecting a gain for correcting the image edge, a pixel value detector for detecting a corrected pixel value regarding the edge data at a position to be corrected by performing an operation on the edge data, at least one pixel adjacent to the edge data, and the gain, and an image signal generator for generating an image whose edge is formed based on the corrected pixels.

US20060013504 discloses a method for image enhancement including performing a multi-resolution decomposition of an input image, thereby generating multi-resolution transform components associated with different image scales, comprising at least first and second image scales. A multi-resolution reconstruction is performed to generate an enhanced image by applying filter coefficients to the multi-resolution transform components, such that different, first and second filter coefficients are respectively applied to the multi-resolution transform components that are associated with the first and second image scales. The decomposition is typically performed using a forward transformation filter, and the reconstruction uses a reverse transformation filter, which is not necessarily an inverse of the forward transformation filter. U.S. Pat. No. 7,295,695 discloses a method of detecting a defect in a reticle or wafer using wavelet transforms to differentiate between real defects and pattern noise. A first image and a second image of a sample are aligned. A wavelet transform is obtained of the difference between the images. The wavelet transformed difference image is filtered to distinguish between real defects and pattern defects.

Nevertheless, the color contrast and detail lost in the luminance is frequently found during the image processing in the conventional methods.

Consequently, there is an unmet need to an image processing method, which is effective in recovering the color contrast and detail lost in the luminance so as to improve sharpness and fine details in both enhanced grayscale and color images.

SUMMARY OF THE INVENTION

The presently claimed invention provides methods for improving sharpness and fine detail in both enhanced grayscale and color images.

Accordingly, a first aspect of the presently claimed invention is to provide a method for improving sharpness and fine details of a grayscale image.

According to an embodiment of the presently claimed invention, a method for image decolorization comprises: splitting an input color image having a plurality of pixels into a red image, a green image and a blue image; performing wavelet transform for the red image, the green image and the blue image to obtain a red wavelet coefficient, a green wavelet coefficient, and a blue wavelet coefficient respectively for each pixel, wherein each of the red wavelet coefficients, the green wavelet coefficients and the blue wavelet coefficients comprises a magnitude and a sign; for each pixel, categorizing the magnitudes of the red wavelet coefficient, the green wavelet coefficient, and the blue wavelet coefficient into a first magnitude $M_L$, a second magnitude $M_M$, and a third magnitude $M_S$, wherein the first magnitude is larger than or equal to the second magnitude, and the second magnitude is larger than or equal to the third magnitude; for each pixel, selecting a sign of a wavelet coefficient having the first magnitude to be a sign of an enhanced wavelet coefficient; for each pixel, calculating a magnitude of the enhanced wavelet coefficient $M_E$ by the below equation: $M_E = M_L + (a*M_M - b*M_S)$ where a denotes a first adjusting parameter, and b denotes a second adjusting parameter; and for each pixel, determining the enhanced wavelet coefficient based on the calculated magnitude of the enhanced wavelet coefficient and the selected sign of the enhanced wavelet coefficient; and applying an inverse wavelet transform to the determined enhanced wavelet coefficients to obtain an enhanced grayscale image.

A second aspect of the presently claimed invention is to provide a method for adjusting the brightness of the enhanced grayscale image.

According to an embodiment of the presently claimed invention, a method for adaptive image decolorization comprises: splitting an input color image having a plurality of pixels into a red image, a green image and a blue image; performing wavelet transform for the red image, the green image and the blue image to obtain a red wavelet coefficient, a green wavelet coefficient, and a blue wavelet coefficient respectively for each pixel, wherein each of the red wavelet coefficients, the green wavelet coefficients and the blue wavelet coefficients comprises a magnitude and a sign; for each pixel, categorizing the magnitudes of the red wavelet coefficient, the green wavelet coefficient, and the blue wavelet coefficient into a first magnitude $M_L$, a second magnitude $M_M$, and a third magnitude $M_S$, wherein the first magnitude is larger than or equal to the second magnitude, and the second magnitude is larger than or equal to the third magnitude; for each pixel, selecting a sign of a wavelet coefficient having the first magnitude to be a sign of an enhanced wavelet coefficient; for each pixel, calculating a magnitude of the enhanced wavelet coefficient $M_E$ by a first equation: $M_E = M_L + (a*M_M - b*M_S)$ where a denotes a first adjusting parameter, and b denotes a second adjusting parameter; for each pixel, determining the enhanced wavelet coefficient based on the calculated magnitude of the enhanced wavelet coefficient and the selected sign of the enhanced wavelet coefficient; calculating a low frequency wavelet energy and a high frequency wavelet energy based on the determined enhanced wavelet coefficients; converting the color image into a gray image; calculating a gray image energy of the gray image; calculating an adaptive brightness control factor based on the low frequency wavelet energy of the enhanced wavelet coefficients, the high frequency wavelet energy of the enhanced wavelet coefficients, and the gray image energy; performing an energy normalization based on the adaptive brightness control factor to normalize the determined enhanced wavelet coefficients; and applying an inverse wavelet transform to the normalized enhanced wavelet coefficients to obtain a normalized enhanced grayscale image with adaptive brightness control.

A third aspect of the presently claimed invention is to provide a method for improving sharpness and fine details of a color image.

According to an embodiment of the presently claimed invention, a method for image decolorization comprises: splitting an input color image having a plurality of pixels into a red image, a green image and a blue image; performing wavelet transform for the red image, the green image and the blue image to obtain a red wavelet coefficient, a green wavelet coefficient, and a blue wavelet coefficient respectively for each pixel, wherein each of the red wavelet coefficients, the green wavelet coefficients and the blue wavelet coefficients comprises a magnitude and a sign; for each pixel, categorizing the magnitudes of the red wavelet coefficient, the green wavelet coefficient, and the blue wavelet coefficient into a first magnitude $M_L$, a second magnitude $M_M$, and a third magnitude $M_S$, wherein the first magnitude is larger than or equal to the second magnitude, and the second magnitude is larger than or equal to the third magnitude; for each pixel, selecting a sign of a wavelet coefficient having the first magnitude to be a sign of an enhanced wavelet coefficient; for each pixel, calculating a magnitude of the enhanced wavelet coefficient $M_E$ by a first equation: $M_E = M_L + (a*M_M - b*M_S)$ where a denotes a first adjusting parameter, and b denotes a second adjusting parameter; for each pixel, determining the enhanced wavelet coefficient based on the calculated magnitude of the enhanced wavelet coefficient and the selected sign of the enhanced wavelet coefficient; calculating a low frequency wavelet energy and a high frequency wavelet energy based on the determined enhanced wavelet coefficients; converting the color image into a gray image; calculating a gray image energy of the gray image; calculating an adaptive brightness control factor based on the low frequency wavelet energy of the enhanced wavelet coefficients, the high frequency wavelet energy of the enhanced wavelet coefficients, and the gray image energy; performing an energy normalization based on the adaptive brightness control factor to normalize the determined enhanced wavelet coefficients; applying an inverse wavelet transform to the normalized enhanced wavelet coefficients to obtain a normalized enhanced grayscale image with adaptive brightness control; splitting the color image into a Y image, an U image, and a V image; and combining the normalized enhanced grayscale image with adaptive brightness control with the U image and the V image to obtain a color enhanced image.

The method of the present invention is capable of showing grayscale images with more details and suitable brightness, as well as color images with more details. Additionally, the present invention is efficient, robust and flexible, and is therefore adaptable for various scenarios and circumstances. Moreover, the present invention is user-friendly. The enhanced grayscale and color images can be generated without any user input required since the method can be performed automatically.

BRIEF DESCRIPTION OF THE DRAWINGS

The patent or application file contains at least one drawing executed in color. Copies of this patent or patent application publication with color drawing(s) will be provided by the Office upon request and payment of the necessary fee. Embodiments of the present invention are described in more details hereinafter with reference to the drawings, in which.

DETAILED DESCRIPTION OF PREFERRED EMBODIMENTS

In the following description, methods for image decolorization and image color enhancement are set forth as preferred examples. It will be apparent to those skilled in the art that modifications, including additions and/or substitutions, may be made without departing from the scope and spirit of the invention. Specific details may be omitted so as not to obscure the invention; however, the disclosure is written to enable one skilled in the art to practice the teachings herein without undue experimentation.

As disclosed therein, "R" denotes red, "B" denotes blue, and "G" denotes green.

The present invention provides methods for efficient image decolorization and color image enhancement. The methods comprise decolorization in frequency domain, adaptive brightness control for the enhanced grayscale image and color image enhancement.

According to wavelet transform theorem, wavelet coefficients of an image with larger magnitude contain significant information, e.g. edge and line. In order to further improve the image details and contrast in the enhanced grayscale image, the present invention provides a new scheme that comprises of two most significant color channels.

The present method performs wavelet transform on each RGB color component of input image, then sorts the RGB wavelet coefficients pixel-by-pixel in descending order for enhanced coefficient calculation which comprises two most significant color channels.

Figure 1:
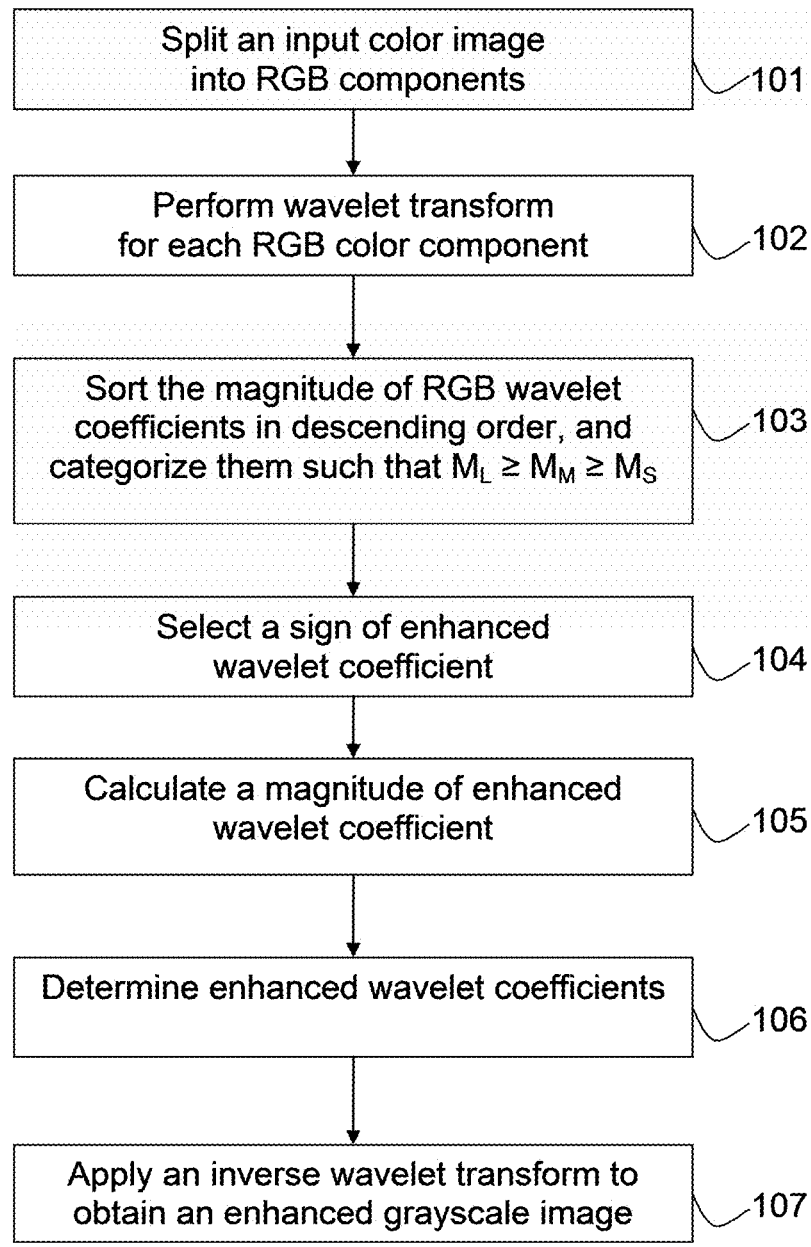
FIG. 1 is a flowchart showing steps of a method for an image decolorization approach according to an embodiment of the presently claimed invention.

FIG. 1 is a flowchart showing steps of a method for an image decolorization approach according to an embodiment of the presently claimed invention. In step 101, an input color image is split into R, G, and B components. In step 102, wavelet transform is performed for each of the RGB color components to obtain RGB wavelet coefficients. Each of the wavelet coefficients is defined by a magnitude and a sign. In step 103, the magnitudes of the RGB wavelet coefficients are sorted for each pixel in a descending order, and categorized them in a large magnitude $M_L$, a medium magnitude $M_M$, and a small magnitude $M_S$ such that $M_L \geq M_M \geq M_S$. In step 104, a sign of a wavelet coefficient having the large magnitude is selected as a sign of enhanced wavelet coefficient. In step 105, the magnitude of enhanced wavelet coefficient $M_E$ is calculated for each pixel based on the sorted magnitudes of RGB wavelet coefficients with an enhanced wavelet coefficient equation as shown:

$$M_E = M_L + (a*M_M - b*M_S) \text{ where: } a \geq b \geq 0$$

In step 106, enhanced wavelet coefficients are determined based on the magnitudes of enhanced wavelet coefficient and the signs of the enhanced wavelet coefficient. In step 107, an inverse wavelet transform is applied to the enhanced wavelet coefficients to obtain an enhanced grayscale image.

Alternatively, the magnitudes of the RGB wavelet coefficients can also be sorted in an ascending order in step 103.

According to an embodiment of the presently claimed invention, an input color image of size m×n is split into RGB components. After performing wavelet transform for each of the RGB color components, each of the wavelet transform coefficients $\{W_{Ri}, W_{Gi}, W_{Bi}\}$ is defined by both a magnitude $\{M_{Ri}, M_{Gi}, M_{Bi}\}$ and a sign $\{S_{Ri}, S_{Gi}, S_{Bi}\}$;
where $M_{Ri} = |W_{Ri}|$ and $S_{Ri} = \text{sign}(W_{Ri})$, i=0, 1, ..., m×n−1;
$M_{Gi} = |W_{Gi}|$ and $S_{Gi} = \text{sign}(W_{Gi})$, i=0, 1, ..., m×n−1;
$M_{Bi} = |W_{Bi}|$ and $S_{Bi} = \text{sign}(W_{Bi})$, i=0, 1, ..., m×n−1.

The magnitudes of RGB wavelet coefficients are sorted pixel-by-pixel in descending order, such that $M_{Li} \geq M_{Mi} \geq M_{Si}$. The sign $S_i$ of the wavelet coefficient which has the largest magnitude $M_{Li}$ is stored. The magnitude of enhanced wavelet coefficient $M_{Ei}$ is calculated as follows:

$$M_E = M_{Li} + (a*M_{Mi} - b*M_{Si})$$

where a≥b≥0, and i=0, 1, ..., m×n−1.

Preferably, the optimal values for the parameters a and b are 0.5. Therefore,
(i) if $M_{Mi} \approx M_{Si}$, then $M_{Ei} \approx M_{Li}$
(ii) if $M_{Mi} \gg M_{Si}$, then $M_{Ei} = M_{Li} + 0.5(M_{Mi} - M_{Si})$ In the case (i), it implies that mainly the first channel $M_L$ contributes to the improvement of the image details and contrast.

In the case (ii), it implies that the second channel $M_M$ also contributes to the improvement of the image details and contrast.

The enhanced wavelet coefficient $W_{Ei}$ is obtained as follows:

$$W_{Ei} = S_i * M_{Ei}$$

Figures 2, 3:
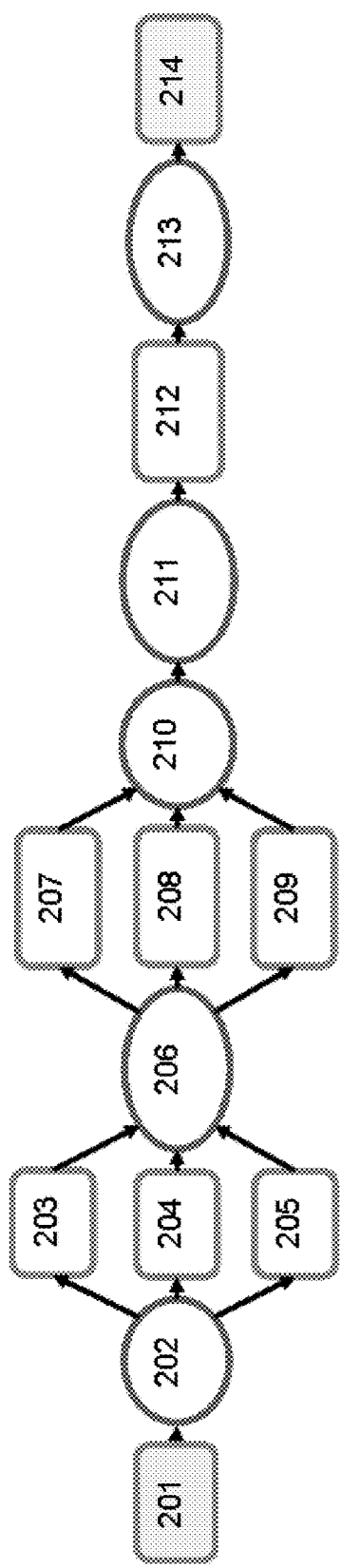
FIG. 2 is a flowchart for an image decolorization approach according to an embodiment of the presently claimed invention.
FIG. 3 is an illustrative example of enhanced wavelet coefficient calculation according to an embodiment of the presently claimed invention.

FIG. 2 is a schematic diagram showing a flowchart for an image decolorization approach according to an embodiment of the presently claimed invention. A color image 201 is provided. In step 202, the color image 201 is split into a R image 203, a G image 204 and a B image 205. In step 206, wavelet transform is performed towards the R image 203, the G image 204 and the B image 205 to obtain wavelet coefficients of the R image 203 (R wavelet coefficients 207), wavelet coefficients of the G image 204 (G wavelet coefficients 208), and wavelet coefficients of the B image 205 (B wavelet coefficients 209) respectively. In step 210, the magnitudes of RGB wavelet coefficients are sorted pixel by pixel in descending order to categorize them in a large magnitude, a medium magnitude, and a small magnitude. The large magnitude is larger than or equal to the medium magnitude, and the medium magnitude is lager than or equal to the small magnitude. A sign of a wavelet coefficient having the large magnitude is selected as a sign of enhanced wavelet coefficient. In step 211, the magnitude of an enhanced wavelet coefficient 212 is calculated. Enhanced wavelet coefficients are determined based on the magnitudes of enhanced wavelet coefficient and the signs of the enhanced wavelet coefficient. In step 213, an inverse wavelet transform is performed with the enhanced wavelet coefficients to obtain an enhanced grayscale image 214.

FIG. 3 is an illustrative example of enhanced wavelet coefficient calculation according to an embodiment of the presently claimed invention. After performing wavelet transform towards a R image, a G image and a B image, an array of R wavelet coefficients 301, an array of G wavelet coefficients 302, and an array of G wavelet coefficients 303 are obtained respectively. After calculation, an array of enhanced wavelet coefficients 304 is acquired. The magnitudes of the RGB wavelet coefficients are obtained by taking absolute values on the RGB wavelet coefficients. If $|W_{R0}| \geq |W_{G0}| \geq |W_{B0}|$, then $M_{L0} = |W_{R0}|$, $S_0 = \text{sign}(W_{R0})$, $M_{M0} = |W_{G0}|$, and $M_{S0} = |W_{B0}|$. With that, $M_{E0} = M_{L0} + (a*M_{M0} - b*M_{S0})$, with a≥b≥0. The enhanced wavelet coefficient is calculated as follows: $W_{E0} = S_0 * M_{E0}$.

The present invention further provides a method for an image decolorization with adaptive brightness control. The method applies an adaptive brightness control parameter to low frequency subband so as to adjust the brightness of the enhanced grayscale image.

After the enhanced wavelet coefficients calculation, the total energy of the enhanced grayscale image is higher than the original grayscale image as such $E_L + E_H \geq E_G$, where $E_L$ denotes the low frequency wavelet energy of the enhanced wavelet coefficients, $E_H$ denotes the high frequency wavelet energy of the enhanced wavelet coefficients, and $E_G$ denotes the gray image energy. Therefore, the overall brightness of the enhanced grayscale image is noticeably higher than the original grayscale image.

Because the low frequency coefficients corresponding to most of the energy concentration presented in the image, high frequency wavelets coefficients represent details in the image, but contributes little spatial-frequency energy. Therefore, in order to preserve detail information of the enhanced grayscale image while maintaining the image energy, the method of the present invention attenuates the energy of low frequency subband. According to Parseval's Theorem, it is assumed that $E_L+E_H=E_G$. Since the magnitudes of enhanced wavelet coefficients are relatively large, an adaptive brightness control parameter $\beta$, and energy normalization are applied.

The energy of low frequency subband is adjusted by the parameter $\beta$ so as to match the overall brightness to the original grayscale image as below equation:

$$(\beta *E_L+E_H)\approx E_G \text{ for energy normalization}$$

where $\beta=1-((E_L+E_H)-E_G)/E_L$.

Figure 4:
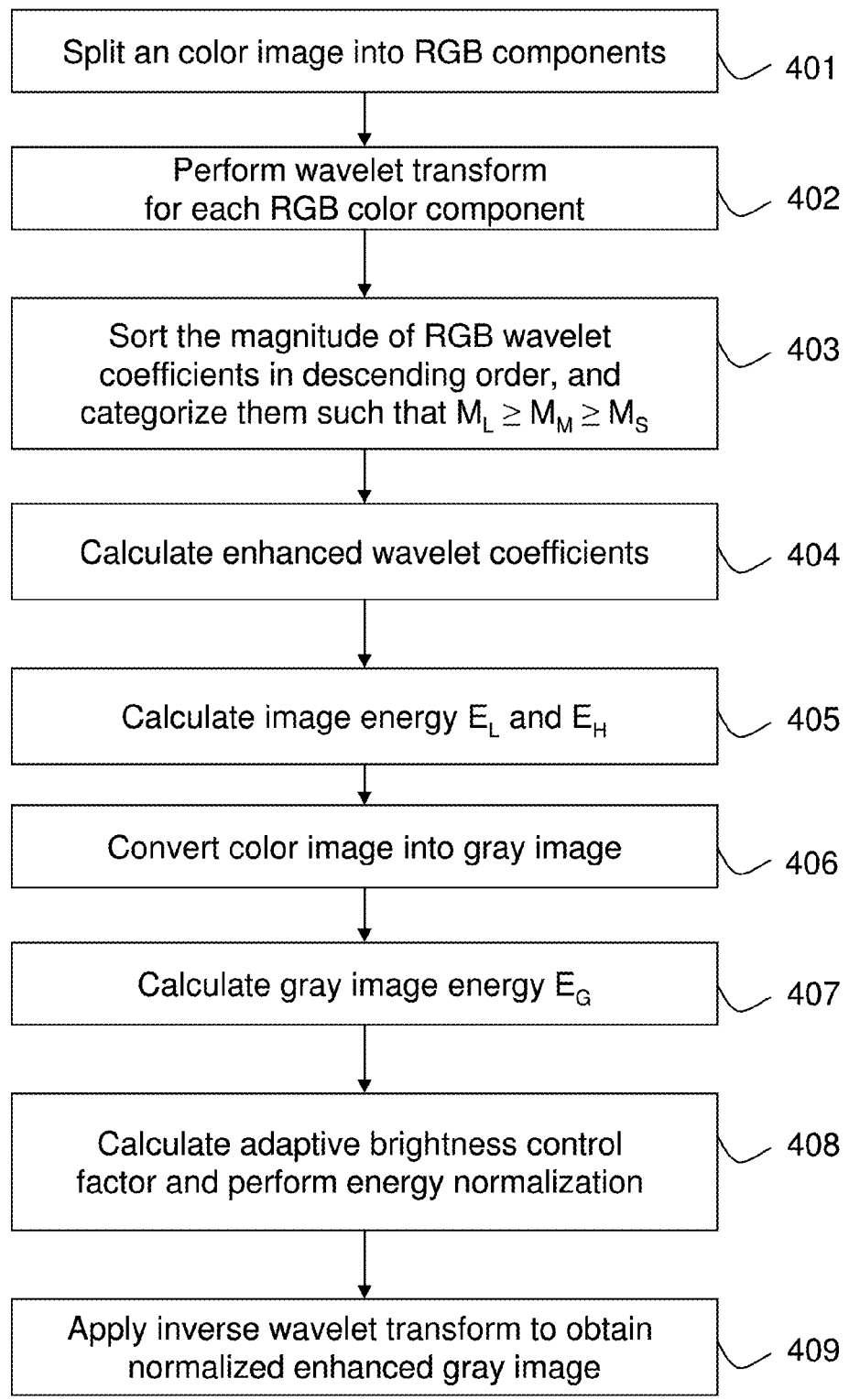
FIG. 4 is a flowchart showing steps of a method for an image decolorization approach with adaptive brightness control according to an embodiment of the presently claimed invention.

FIG. 4 is a flowchart showing steps of a method for image decolorization with adaptive brightness control according to an embodiment of the presently claimed invention. In step 401, an input color image is split into R, G, and B components. In step 402, wavelet transform is performed for each of the RGB color components to obtain RGB wavelet coefficients for each pixel. In step 403, the magnitudes of RGB wavelet coefficients are sorted for each pixel in descending order, and categorized such that $M_L \geq M_M \geq M_S$. In step 404, the enhanced wavelet coefficients is calculated based on magnitudes and signs of enhanced wavelet coefficient, which are obtained from the sorted magnitudes of RGB wavelet coefficients. In step 405, low frequency wavelet energy $E_L$ and high frequency wavelet energy $E_H$ are calculated based on the enhanced wavelet coefficients. In step 406, the color image is converted into a gray image. In step 407, a gray image energy $E_G$ of the gray image is calculated. In step 408, an adaptive brightness control factor $\beta$ is calculated based on the low frequency wavelet energy $E_L$, high frequency wavelet energy $E_H$, and gray image energy $E_G$, and energy normalization is performed based on the factor $\beta$ to normalize the enhanced wavelet coefficients. In step 409, inverse wavelet transform is applied to the normalized enhanced wavelet coefficients to obtain a normalized enhanced gray image with adaptive brightness control.

Figure 4A:
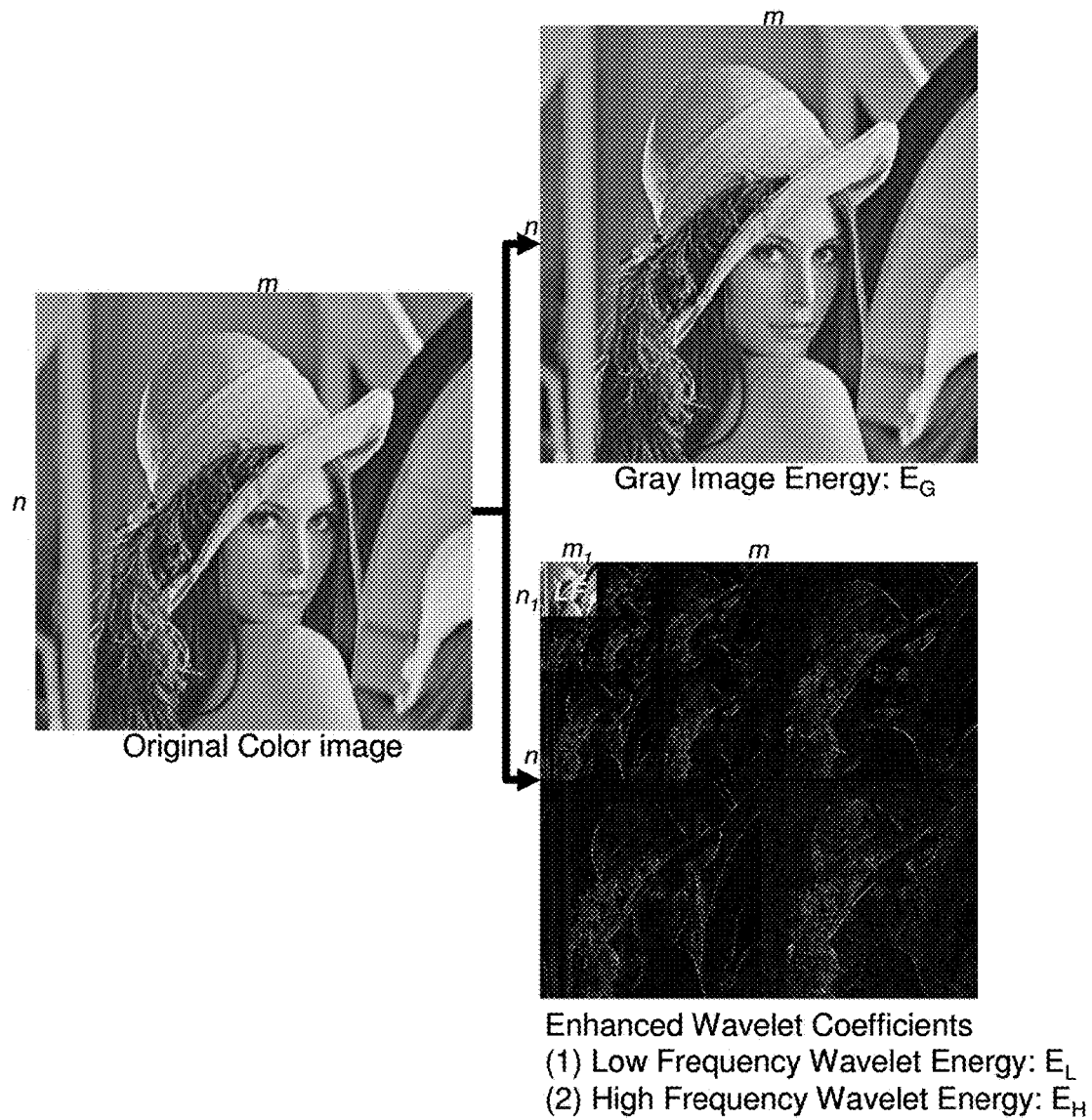
FIG. 4A show steps of calculating image energies according to an embodiment of the presently claimed invention.

According to an embodiment of the present invention, an original color image, as shown in FIG. 4A, comprises a width m and a height n. The original color image is converted into a gray image. Its gray image energy $E_G$ is calculated by the below equation:

$$E_C = \sum_{x=0}^{m-1}\sum_{y=0}^{n-1}|I(x,y)|^2$$

where I(x,y) denotes a pixel intensity of the gray scale image obtained by conventional RGB to gray conversion; (x,y) denotes a pixel coordination; and (m,n) denotes an width and height of the image.

A plurality of enhanced wavelet coefficients are obtained by the image decolorization approach of the present invention, and the low frequency wavelet energy $E_L$ is calculated by the below equation:

$$E_L = \sum_{x=0}^{m1-1}\sum_{y=0}^{n1-1}|W(x,y)|^2$$

where W(x,y) denotes an enhanced wavelet coefficient of the enhanced gray image; and (m1,n1) denotes a width and height of the low frequency wavelet coefficient.

Accordingly, the high frequency wavelet energy $E_H$ is calculated by the below equation:

$$E_H = \sum_{x=0}^{m-1}\sum_{y=n1}^{n-1}|W(x,y)|^2 + \sum_{x=m1}^{m-1}\sum_{y=0}^{n-1}|W(x,y)|^2$$

Figure 5:
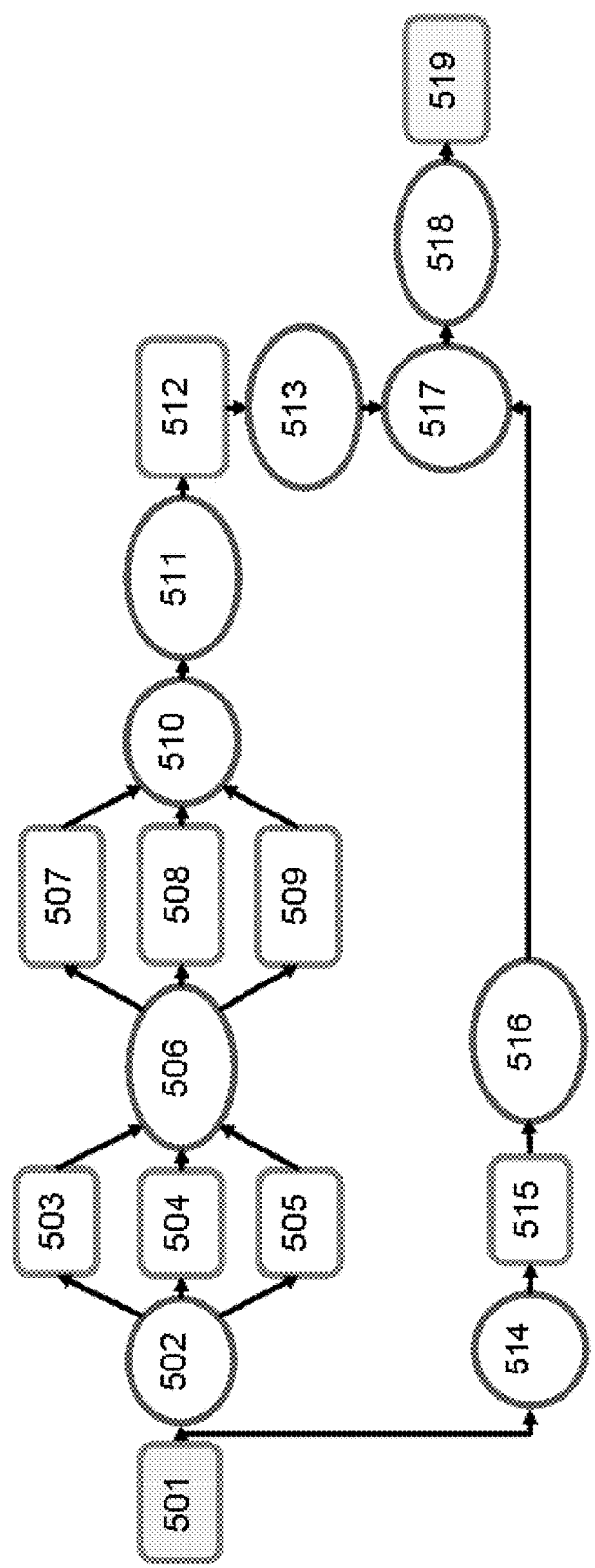
FIG. 5 is a flowchart for an image decolorization approach with adaptive brightness control according to an embodiment of the presently claimed invention.

FIG. 5 is a flowchart for image decolorization with adaptive brightness control according to an embodiment of the presently claimed invention. A color image 501 is provided. In step 502, the color image 501 is split into a R image 503, a G image 504 and a B image 505. In step 506, wavelet transform is performed towards the R image 503, the G image 504 and the B image 505 to obtain R wavelet coefficients 507, G wavelet coefficients 508, and B wavelet coefficients 509 respectively. In step 510, the three magnitudes of RGB wavelet coefficients are sorted pixel by pixel in descending order to categorize them such that $M_L \geq M_M \geq M_S$. In step 511, enhanced wavelet coefficients 512 are calculated based on magnitudes and signs of enhanced wavelet coefficient, which are obtained from the sorted magnitudes of RGB wavelet coefficients. In step 513, a low frequency wavelet energy and a high frequency wavelet energy are calculated based on the enhanced wavelet coefficients. In step 514, the color image is converted to a gray image 515. In step 516, gray image energy of the gray image is calculated. In step 517, an adaptive brightness control factor is calculated based on the gray image energy, the low frequency wavelet energy and the high frequency wavelet energy, and energy normalization is performed to normalize the enhanced grayscale image based on the adaptive control factor. In step 518, an inverse wavelet transform is applied to the normalized enhanced wavelet coefficients to obtain a normalized enhanced gray image with adaptive brightness control 519.

The present invention further provides a method for a color image enhancement approach. The method integrates the enhanced grayscale image into the luminance channel in YUV space to achieve better color image enhancement.

Figure 6:
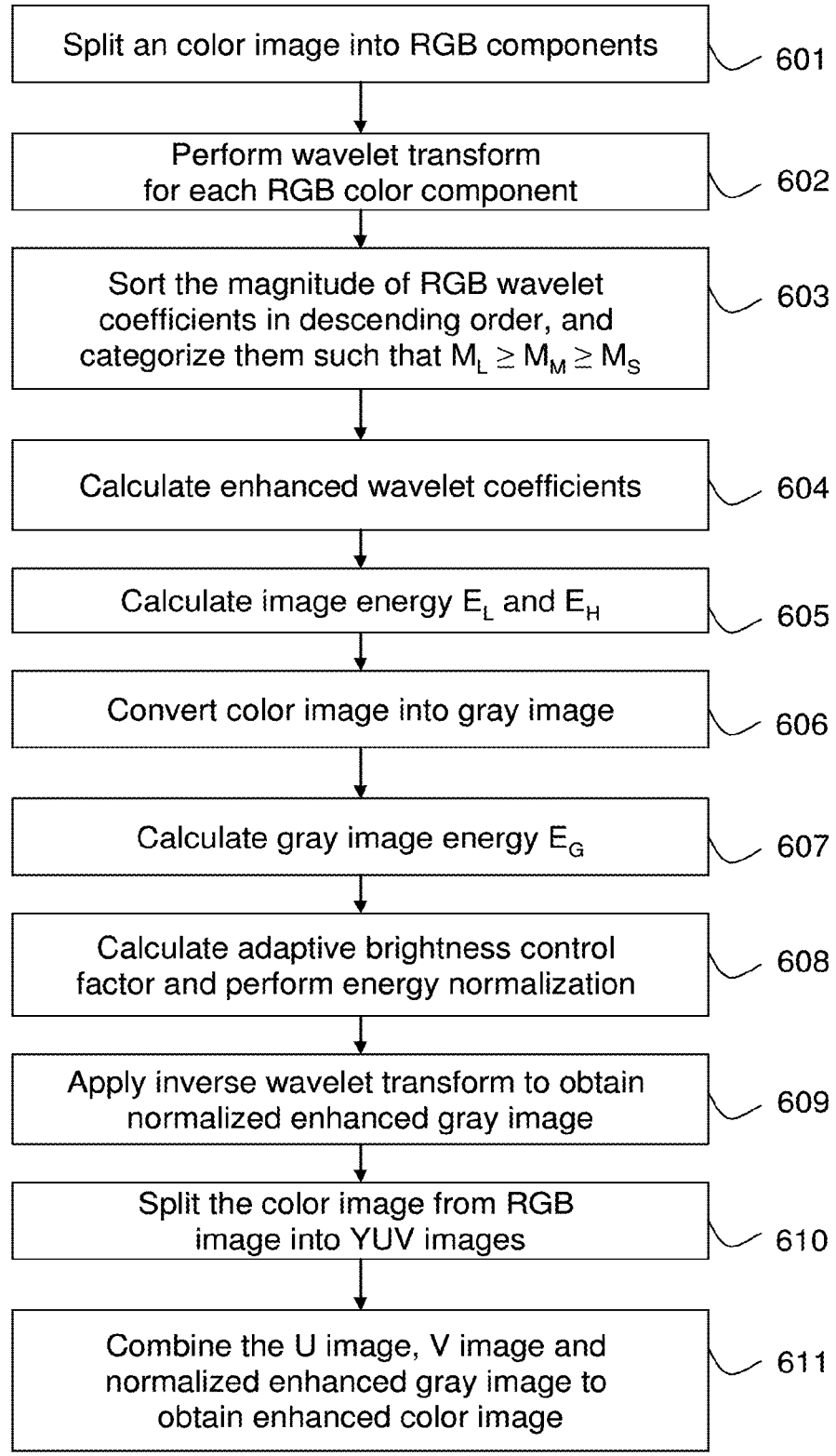
FIG. 6 is a flowchart showing steps of a method for a color image enhancement approach according to an embodiment of the presently claimed invention.

FIG. 6 is a flowchart showing steps of a method for color image enhancement approach according to an embodiment of the presently claimed invention. In step 601, an input color image is split into R, G, and B components. In step 602, wavelet transform is performed for each of the RGB color components to obtain RGB wavelet coefficients for each pixel. In step 603, the magnitudes of RGB wavelet coefficients are sorted for each pixel in descending and categorized such that $M_L \geq M_M \geq M_S$. In step 604, enhanced wavelet coefficient is calculated based on magnitudes and signs of enhanced wavelet coefficient, which are obtained from the sorted magnitudes of RGB wavelet coefficients. In step 605, low frequency wavelet energy $E_L$ and high frequency wavelet energy $E_H$ are calculated based on the enhanced wavelet coefficients. In step 606, the color image is converted into a gray image. In step 607, a gray image energy $E_G$ of the gray image is calculated. In step 608, the adaptive brightness control factor $\beta$ is calculated based on the low frequency wavelet energy $E_L$, high frequency wavelet energy $E_H$, and gray image energy $E_G$, and energy normalization is performed based on the factor $\beta$ to normalize the enhanced wavelet coefficients. In step 609, inverse wavelet transform is applied to the normalized enhanced wavelet coefficients to obtain a normalized enhanced gray image with adaptive brightness control. In step 610, the color image is split into a Y image, an U image and a V image. In step 611, the U image, the V image and the normalized enhanced gray image with adaptive brightness control are combined into an enhanced color image.

Figure 7:
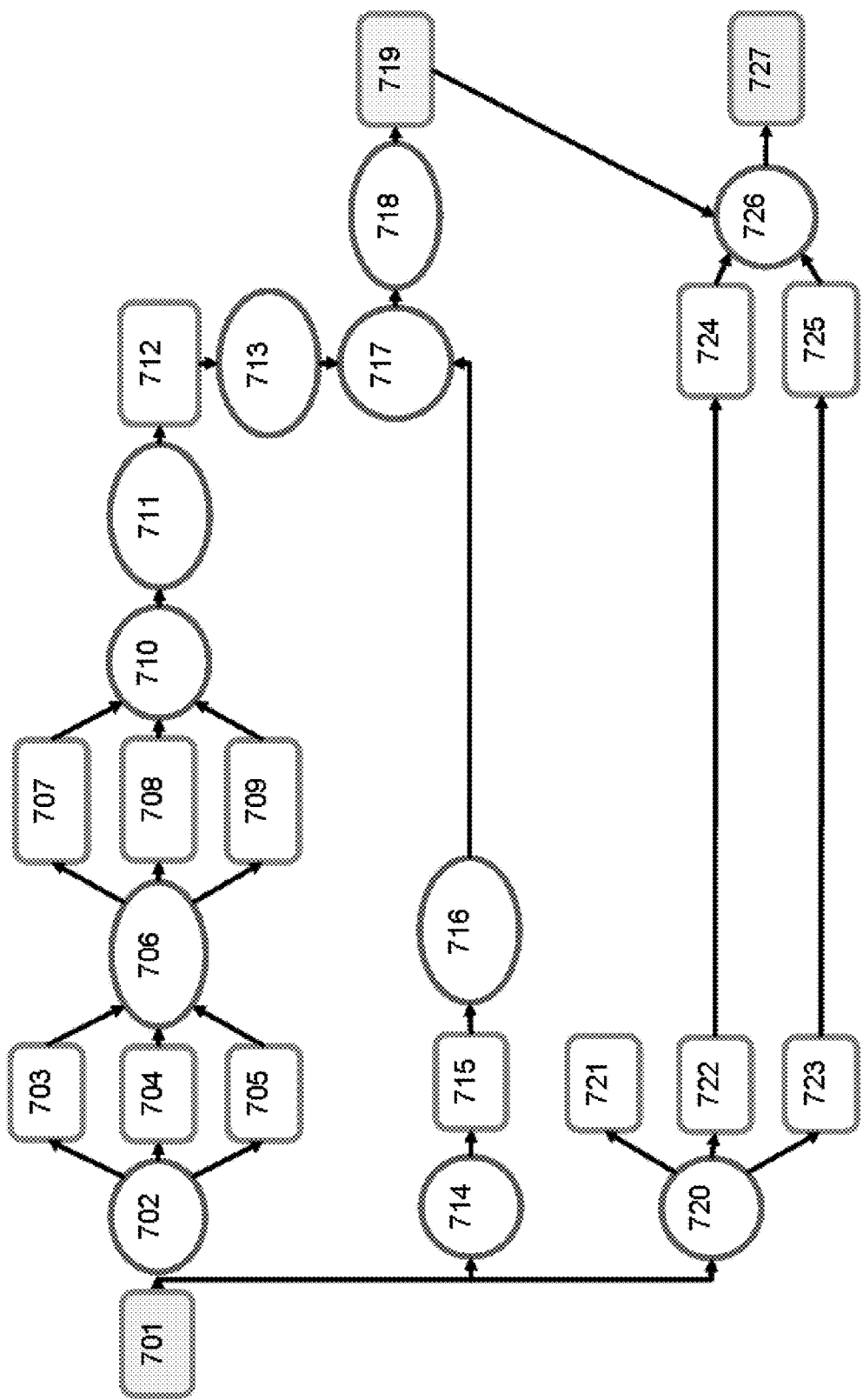
FIG. 7 is a flowchart for a color image enhancement approach according to an embodiment of the presently claimed invention.

FIG. 7 is a flowchart for a color image enhancement approach according to an embodiment of the presently claimed invention. A color image 701 is provided. In step 702, the color image 701 is split into a R image 703, a G image 704 and a B image 705. In step 706, wavelet transform is performed towards the R image 703, the G image 704 and the B image 705 to obtain R wavelet coefficients 707, G wavelet coefficients 708, and B wavelet coefficients 709 respectively. In step 710, the three magnitudes of RGB wavelet coefficients are sorted pixel by pixel in descending order to categorize them such that $M_L \geq M_M \geq M_S$. In step 711, enhanced wavelet coefficients 712 are calculated based on magnitudes and signs of enhanced wavelet coefficient, which are obtained from the sorted magnitudes of RGB wavelet coefficients. In step 713, a low frequency wavelet energy and a high frequency wavelet energy are calculated based on the enhanced wavelet coefficients. In step 714, the color image is converted to a gray image 715. In step 716, gray image energy is calculated for the gray image. In step 717, the adaptive brightness control factor is calculated based on the gray image energy, the low frequency wavelet energy and the high frequency wavelet energy, and energy normalization is performed to normalize the enhanced grayscale image based on the adaptive brightness control factor. In step 718, an inverse wavelet transform is applied to the normalized enhanced wavelet coefficients to obtain a normalized enhanced gray image with adaptive brightness control 719. In step 720, the color image 701 is converted into a Y image 721, an U image 722, and a V image 723. In step 724, the normalized enhanced gray image with adaptive brightness control 719, the U image 722, and the V image 723 are combined together to form an enhanced color image 725.

Experimental Results

Figure 8A:
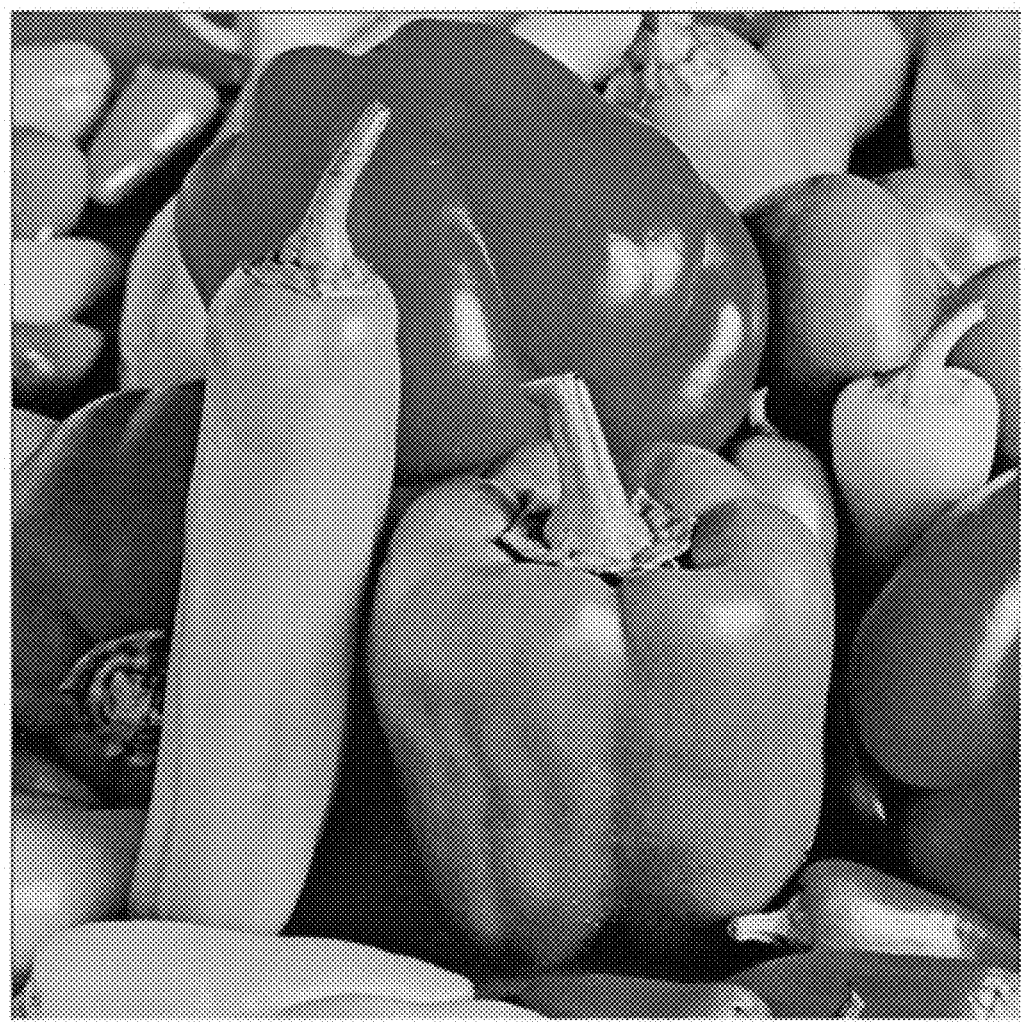
FIG. 8A is an original color image.
Figure 8B:
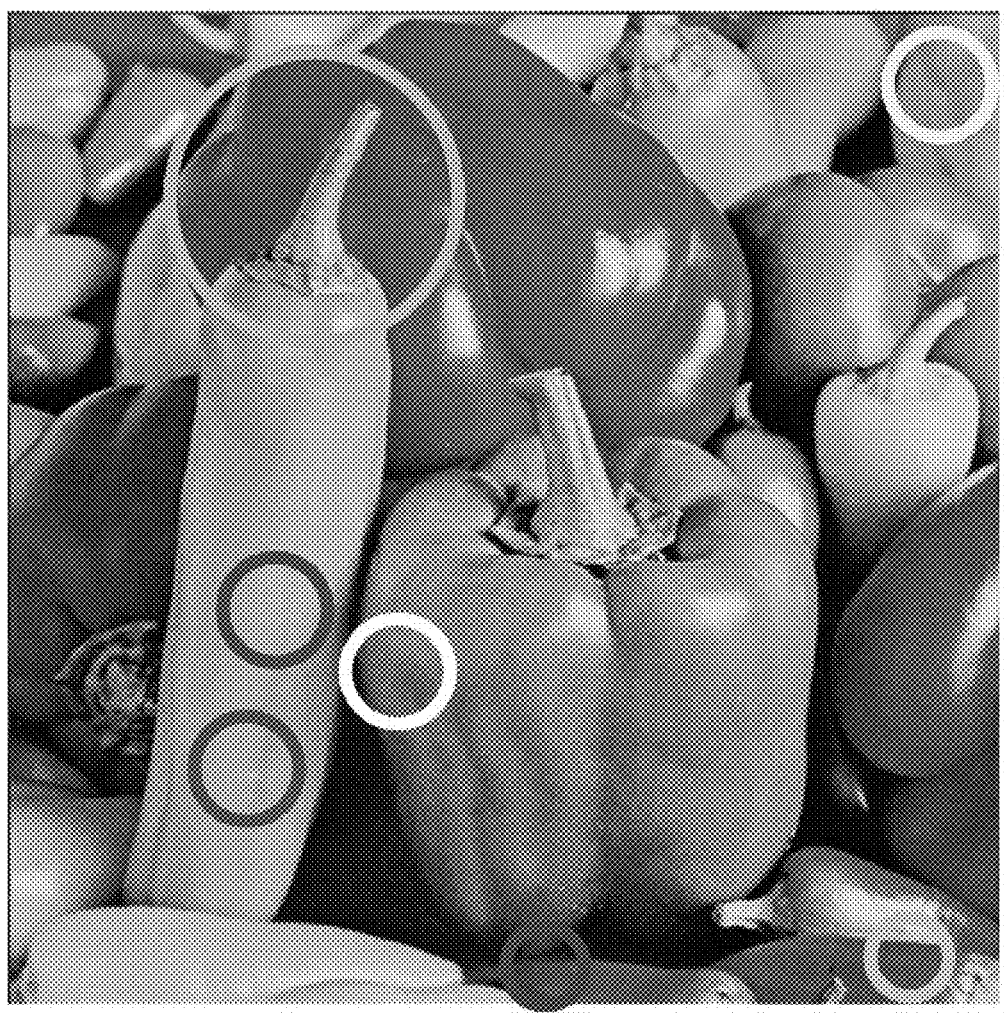
FIG. 8B is an original grayscale image generated from the color image of FIG. 8A according to a prior art.
Figure 8C:
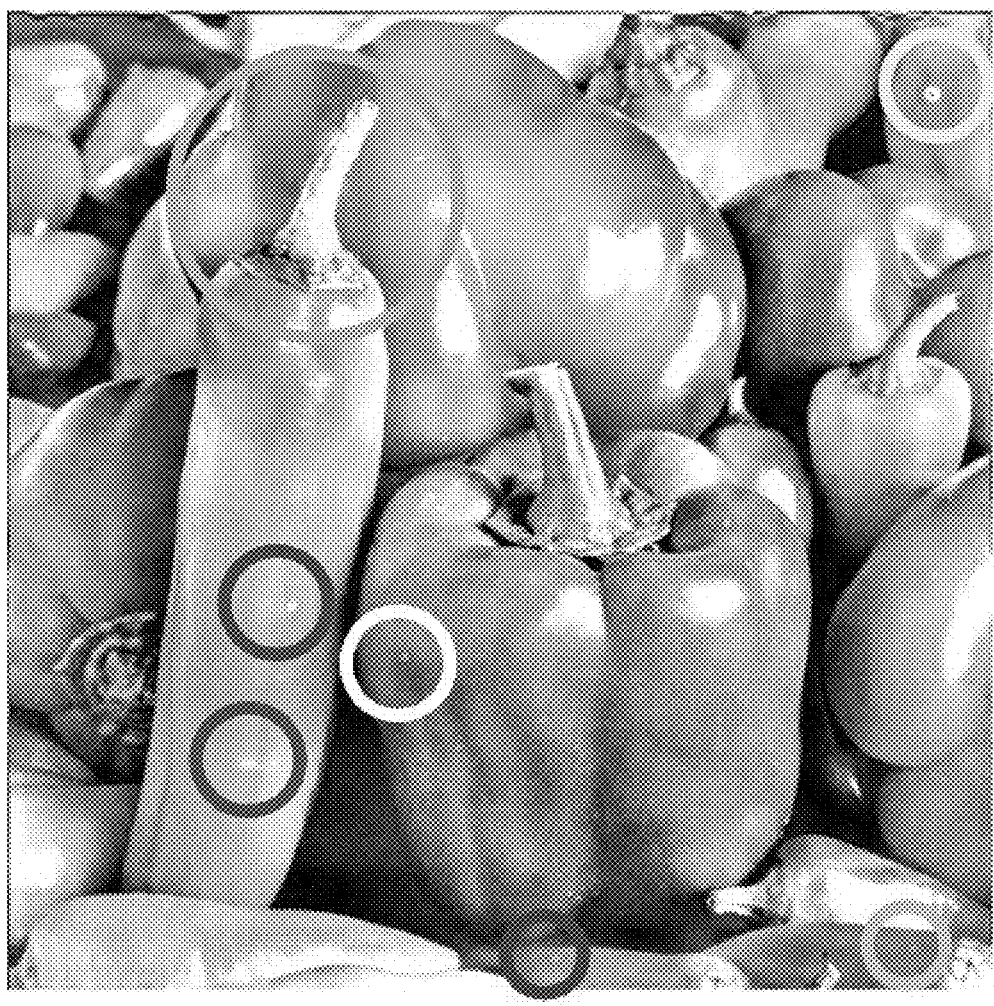
FIG. 8C is an enhanced grayscale image generated from the color image of FIG. 8A according to an embodiment of the presently claimed invention.

The experimental result regarding to the image decolorization is shown as follows. FIG. 8A is an original color image. FIG. 8B is an original grayscale image generated from the color image of FIG. 8A according to a prior art (traditional RGB to gray conversion). FIG. 8C is an enhanced grayscale image generated from the color image of FIG. 8A according to an embodiment of the presently claimed invention. Comparing between FIG. 8B and FIG. 8C, FIG. 8C is able to show more details in the image, as highlighted by the circles. Hence the method of the present invention provides the grayscale image with more details.

Figure 9A:
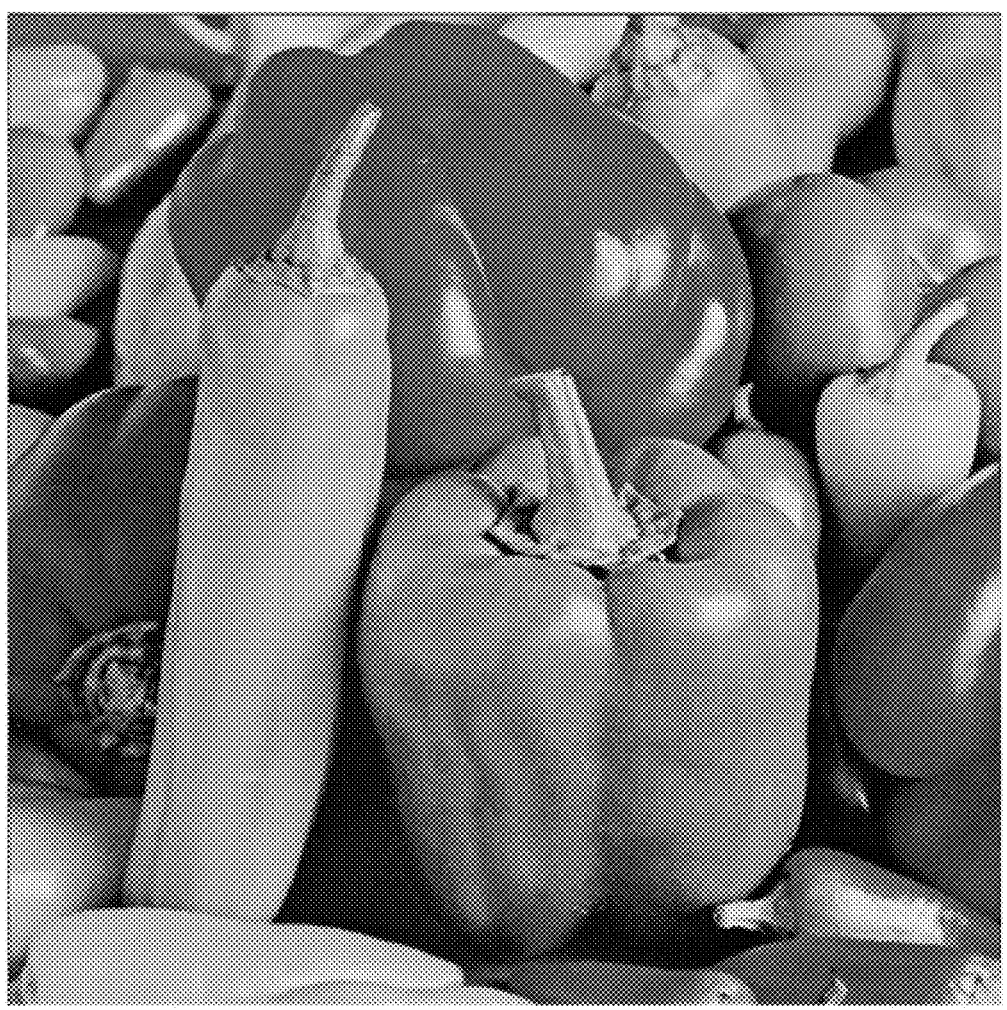
FIG. 9A is a grayscale image according to a prior art.
Figure 9B:
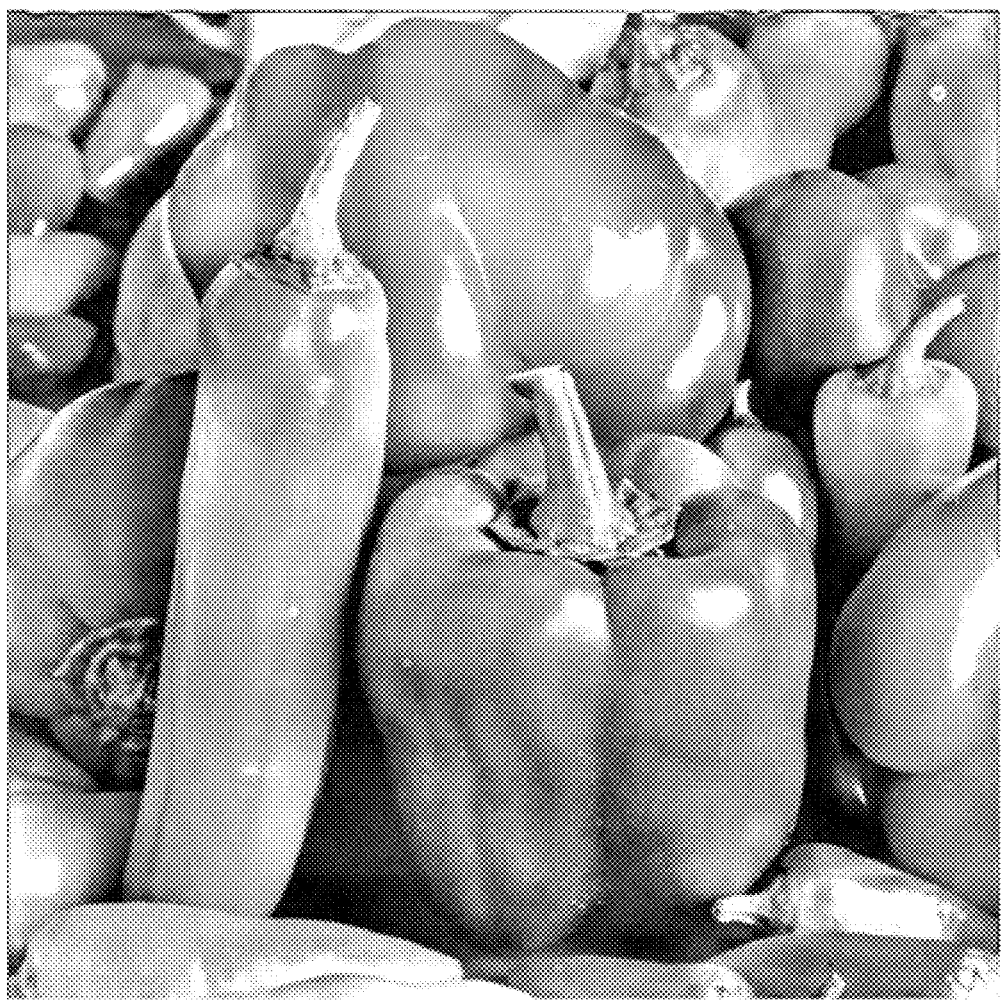
FIG. 9B is an enhanced grayscale image without adaptive brightness control according to an embodiment of the presently claimed invention.
Figure 9C:
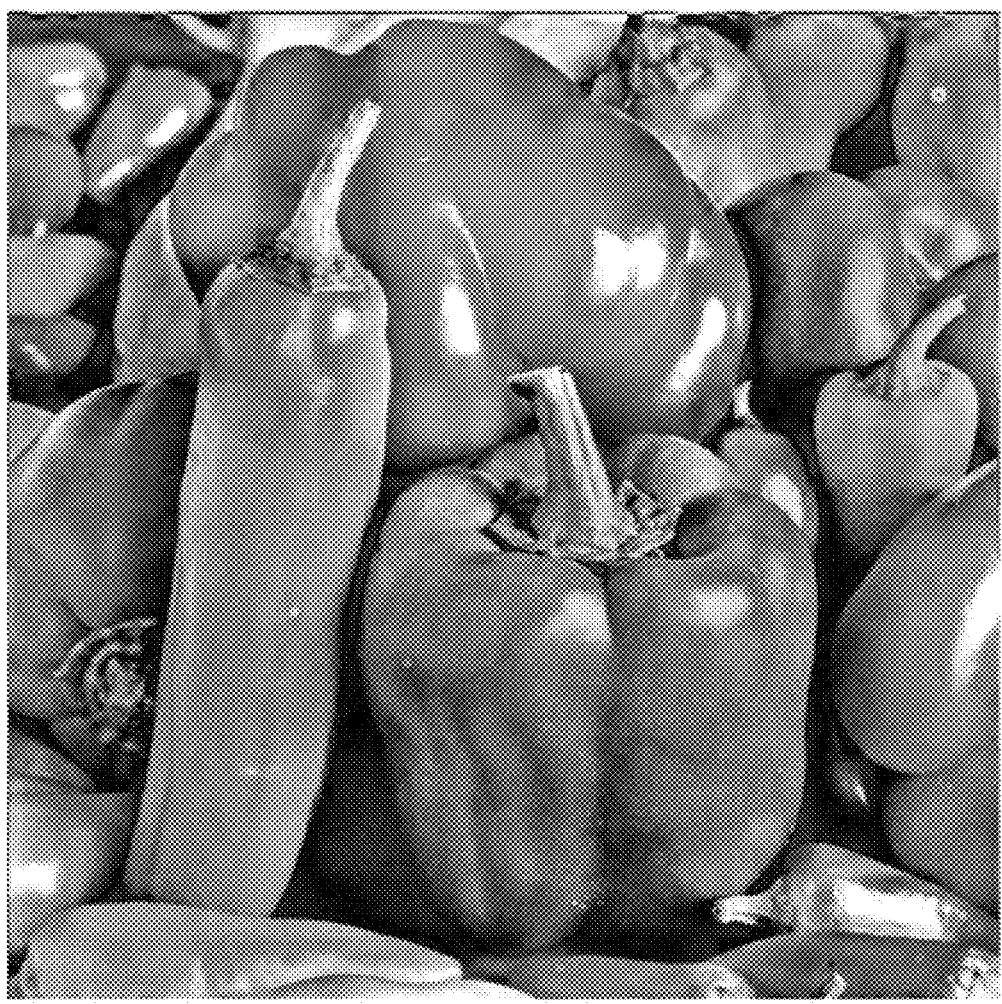
FIG. 9C is an enhanced grayscale image with adaptive brightness control according to an embodiment of the presently claimed invention.

The experimental result regarding to the image decolorization with adaptive brightness control is shown as follows. FIG. 9A is a grayscale image (traditional RGB to gray conversion) according to a prior art. FIG. 9B is an enhanced grayscale image without adaptive brightness control according to an embodiment of the presently claimed invention. FIG. 9C is an enhanced grayscale image with adaptive brightness control according to an embodiment of the presently claimed invention. Both FIG. 9B and FIG. 9C can show more details than FIG. 9A as highlighted by the circles. However, FIG. 9C show the grayscale image with brightness close to the reference image of FIG. 9A. Hence the method of the present invention provides the grayscale image with more details as well as more appropriate brightness under adaptive brightness control.

Figure 10A:
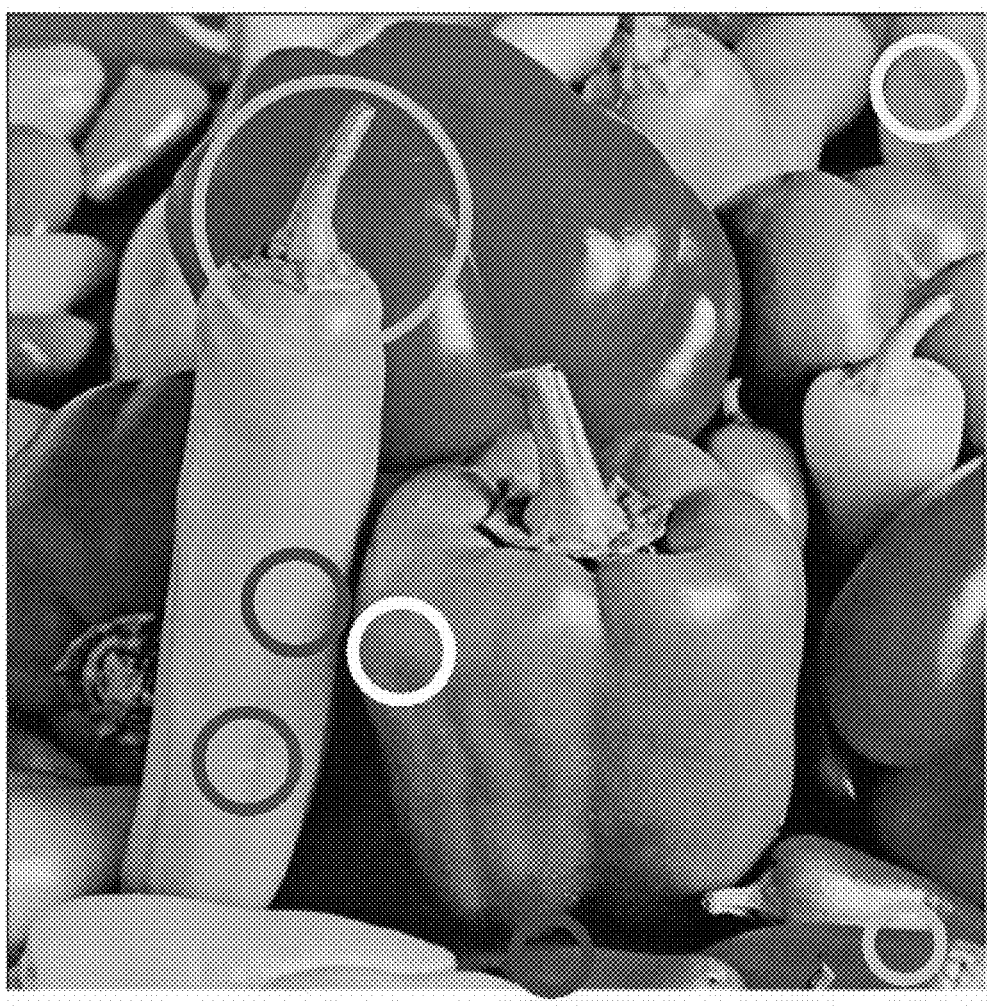
FIG. 10A is an original color image.
Figure 10B:
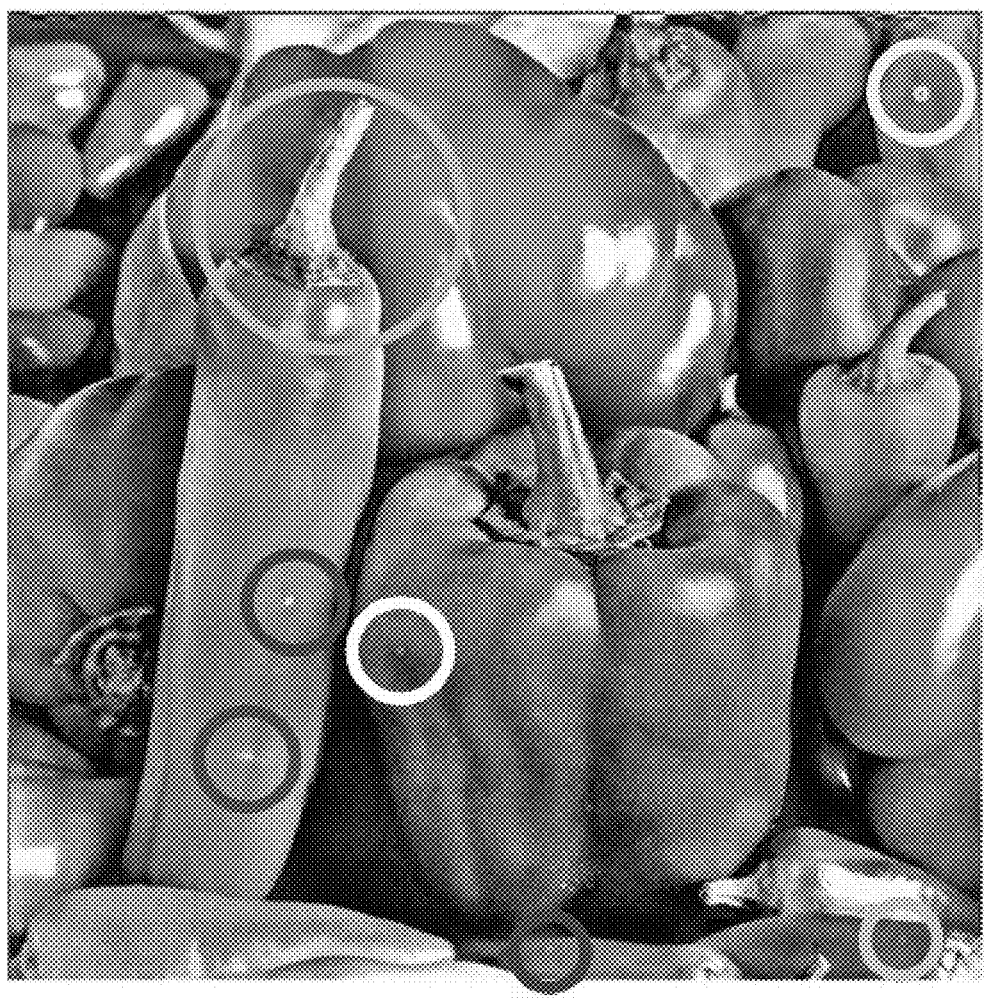
FIG. 10B is an enhanced color image generated from the color image of FIG. 10A according to an embodiment of the presently claimed invention.

The experimental result regarding to the color image enhancement is shown as follows. FIG. 10A is an original color image. FIG. 10B is an enhanced color image generated from the color image of FIG. 10A according to an embodiment of the presently claimed invention. FIG. 10B is able to show more details than FIG. 10A as highlighted by the circles. Hence the method of the present invention provides the color image with more details.

Objective performance evaluation for image decolorization is performed between the present invention and a prior art. To enable an objective quantification of the performance of decolorization method, the normalized cross-correlation NCC between the resulting grayscale image and R, G, B color channels of the original input images is adopted. The NCC calculation is shown as follows:

$$NCC = \frac{1}{3}\sum_{i=1}^{3} \frac{\sum_{x,y}[I_i(x,y) \cdot I_g(x,y)]}{\sqrt{\sum_{x,y}I_i(x,y)^2 \cdot \sum_{x,y}I_g(x,y)^2}}$$

where $I_i$ represents intensity of one of the three R, G, or B channels of a color input image; $I_g$ represents intensity of an enhanced gray image; and (x,y) represents the image coordination.

Figure 11:
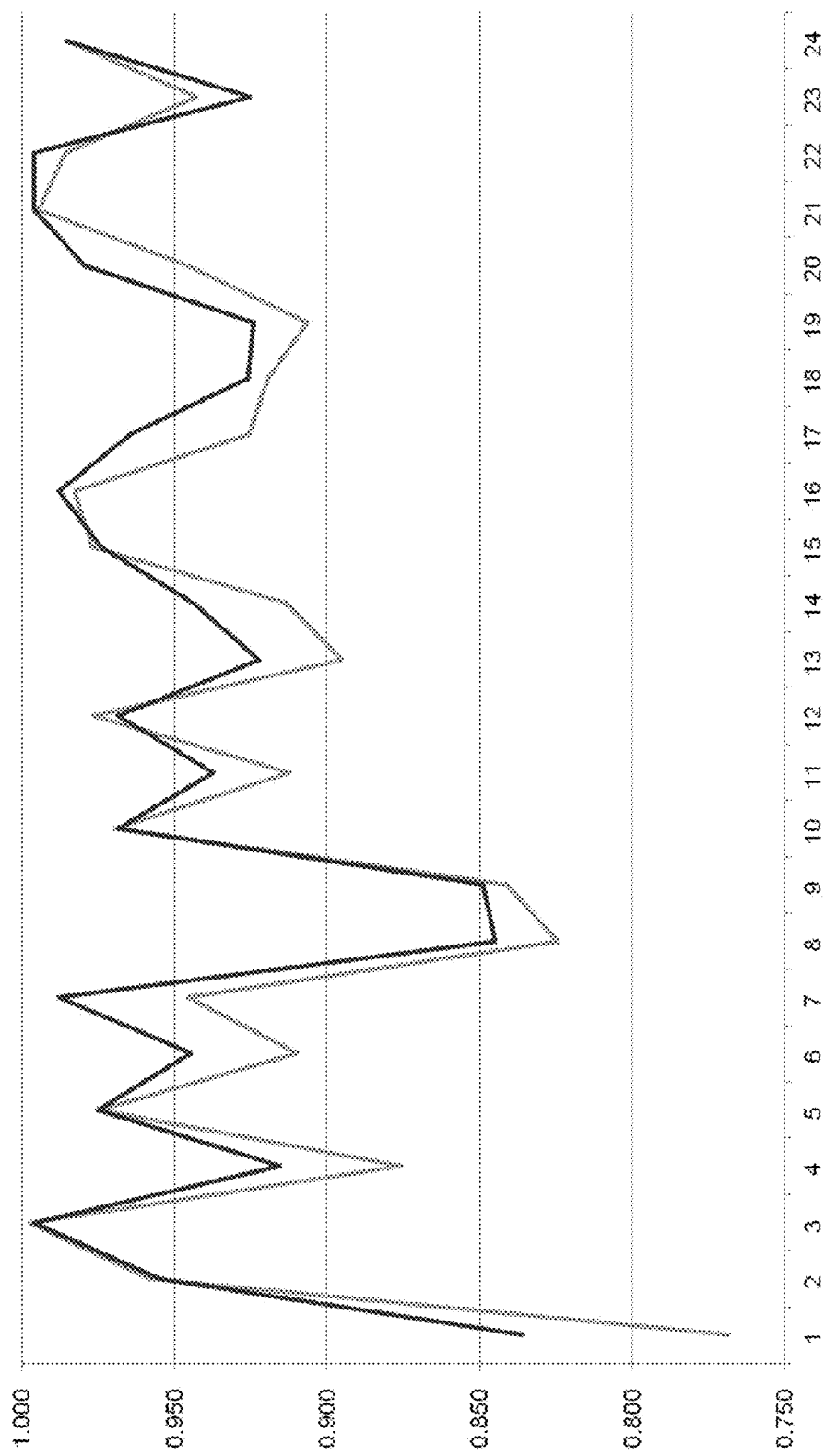
FIG. 11 is a graph showing experimental results with normalized cross correlation according to an embodiment of the presently claimed invention.

24 standard test images are used for the performance test. FIG. 11 is a graph showing experimental results with normalized cross correlation according to an embodiment of the presently claimed invention. The lighter line shows the results obtained by the method of a prior art, and the darker line shows the result obtained by method of the present invention. As shown in FIG. 11, most of the images modified by the present invention have higher NCC values than those modified by the prior art. In addition, the average NCC value for the 24 test images of the present invention is 0.946, whereas that of the prior art is 0.930 only, indicating the present invention able to preserve better sharpness and fine details after image decolorization.

According to the present invention, the method for image decolorization is applicable to monochromatic printing, displaying color images on monochromatic medical displays, and pattern recognition. On the other hand, the method for color image enhancement is applicable to medical image enhancement, defect detection, and visual inspection and interpretation.

The embodiments disclosed herein may be implemented using a general purpose or specialized computing device, computer processor, or electronic circuitry including but not limited to a digital signal processor (DSP), application specific integrated circuit (ASIC), a field programmable gate array (FPGA), and other programmable logic device configured or programmed according to the teachings of the present disclosure. Computer instructions or software codes running in the general purpose or specialized computing device, computer processor, or programmable logic device can readily be prepared by practitioners skilled in the software or electronic art based on the teachings of the present disclosure.

In some embodiments, the present invention includes a computer storage medium having computer instructions or software codes stored therein which can be used to program a computer or microprocessor to perform any of the processes of the present invention. The storage medium can include, but is not limited to, floppy disks, optical discs, Blu-ray Disc, DVD, CD-ROMs, and magneto-optical disks, ROMs, RAMs, flash memory devices, or any type of media or device suitable for storing instructions, codes, and/or data. The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for image decolorization, comprising:
splitting an input color image having a plurality of pixels into a red image, a green image and a blue image;
performing wavelet transform for the red image, the green image and the blue image to obtain a red wavelet coefficient, a green wavelet coefficient, and a blue wavelet coefficient respectively for each pixel, wherein each of the red wavelet coefficients, the green wavelet coefficients and the blue wavelet coefficients for the plurality of pixels comprises a magnitude and a sign;
for each pixel, categorizing the magnitudes of the red wavelet coefficient, the green wavelet coefficient, and the blue wavelet coefficient into a first magnitude $M_L$, a second magnitude $M_M$, and a third magnitude $M_S$, wherein the first magnitude is larger than or equal to the second magnitude, and the second magnitude is larger than or equal to the third magnitude;
for each pixel, selecting a sign of a wavelet coefficient having the first magnitude to be a sign of an enhanced wavelet coefficient;
for each pixel, calculating a magnitude of the enhanced wavelet coefficient $M_E$ by the below equation:

$$M_E = M_L + (a*M_M - b*M_S)$$

where a denotes a first adjusting parameter, and b denotes a second adjusting parameter;
for each pixel, determining the enhanced wavelet coefficient based on the calculated magnitude of the enhanced wavelet coefficient and the selected sign of the enhanced wavelet coefficient; and
applying an inverse wavelet transform to the determined enhanced wavelet coefficients for the plurality of pixels to obtain an enhanced grayscale image.

2. The method of claim 1, wherein for each pixel, the magnitudes of the red wavelet coefficient, the green wavelet coefficient, and the blue wavelet coefficient are obtained by taking absolute values of the red wavelet coefficient, the green wavelet coefficient, and the blue wavelet coefficient respectively.

3. The method of claim 1, wherein for each pixel, the magnitudes of the red wavelet coefficient, the green wavelet coefficient, and the blue wavelet coefficient are sorted in a descending or an ascending order before the step of categorizing the magnitudes of the red wavelet coefficient, the green wavelet coefficient, and the blue wavelet coefficient into the first magnitude, the second magnitude, and the third magnitude.

4. The method of claim 1, wherein the first adjusting parameter is equal to or larger than the second adjusting parameter, and the second adjusting parameter is equal to or larger than zero.

5. The method of claim 1, wherein the first adjusting parameter and the second adjusting parameter are equal to 0.5.

6. A method for adaptive image decolorization, comprising:
splitting an input color image having a plurality of pixels into a red image, a green image and a blue image;
performing wavelet transform for the red image, the green image and the blue image to obtain a red wavelet coefficient, a green wavelet coefficient, and a blue wavelet coefficient respectively for each pixel, wherein each of the red wavelet coefficients, the green wavelet coefficients and the blue wavelet coefficients for the plurality of pixels comprises a magnitude and a sign;
for each pixel, categorizing the magnitudes of the red wavelet coefficient, the green wavelet coefficient, and the blue wavelet coefficient into a first magnitude $M_L$, a second magnitude $M_M$, and a third magnitude $M_S$, wherein the first magnitude is larger than or equal to the second magnitude, and the second magnitude is larger than or equal to the third magnitude;
for each pixel, selecting a sign of a wavelet coefficient having the first magnitude to be a sign of an enhanced wavelet coefficient;
for each pixel, calculating a magnitude of the enhanced wavelet coefficient $M_E$ by a first equation:

$$M_E = M_L + (a*M_M - b*M_S)$$

where a denotes a first adjusting parameter, and b denotes a second adjusting parameter;
for each pixel, determining the enhanced wavelet coefficient based on the calculated magnitude of the enhanced wavelet coefficient and the selected sign of the enhanced wavelet coefficient;
calculating a low frequency wavelet energy and a high frequency wavelet energy based on the determined enhanced wavelet coefficients;
converting the input color image into a gray image;
calculating a gray image energy of the gray image;
calculating an adaptive brightness control factor based on the low frequency wavelet energy of the enhanced wavelet coefficients, the high frequency wavelet energy of the enhanced wavelet coefficients, and the gray image energy;
performing an energy normalization based on the adaptive brightness control factor to normalize the determined enhanced wavelet coefficients; and
applying an inverse wavelet transform to the normalized enhanced wavelet coefficients for the plurality of pixels to obtain a normalized enhanced grayscale image with adaptive brightness control.

7. The method of claim 6, wherein for each pixel, the magnitudes of the red wavelet coefficient, the green wavelet coefficient, and the blue wavelet coefficient are obtained by taking absolute values of the red wavelet coefficient, the green wavelet coefficient, and the blue wavelet coefficient respectively.

8. The method of claim 6, wherein for each pixel, the magnitudes of the red wavelet coefficient, the green wavelet coefficient, and the blue wavelet coefficient are sorted in a descending or an ascending order before the step of categorizing the magnitudes of the red wavelet coefficient, the green wavelet coefficient, and the blue wavelet coefficient into the first magnitude, the second magnitude, and the third magnitude.

9. The method of claim 6, wherein the first adjusting parameter is equal to or larger than the second adjusting parameter, and the second adjusting parameter is equal to or larger than zero.

10. The method of claim 6, wherein the first adjusting parameter and the second adjusting parameter are equal to 0.5.

11. The method of claim 6, wherein the adaptive brightness control factor $\beta$ is calculated by a second equation:

$$\beta=1-((E_L+E_H)-E_G)/E_L$$

where $E_L$ denotes the low frequency wavelet energy of the enhanced wavelet coefficients, $E_H$ denotes the high frequency wavelet energy of the enhanced wavelet coefficients, and $E_G$ denotes the gray image energy.

12. A method for color image enhancement, comprising:
splitting an input color image having a plurality of pixels into a red image, a green image and a blue image;
performing wavelet transform for the red image, the green image and the blue image to obtain a red wavelet coefficient, a green wavelet coefficient, and a blue wavelet coefficient respectively for each pixel, wherein each of the red wavelet coefficients, the green wavelet coefficients and the blue wavelet coefficients for the plurality of pixels comprises a magnitude and a sign;
for each pixel, categorizing the magnitudes of the red wavelet coefficient, the green wavelet coefficient, and the blue wavelet coefficient into a first magnitude $M_L$, a second magnitude $M_M$, and a third magnitude $M_S$, wherein the first magnitude is larger than or equal to the second magnitude, and the second magnitude is larger than or equal to the third magnitude;
for each pixel, selecting a sign of a wavelet coefficient having the first magnitude to be a sign of an enhanced wavelet coefficient;
for each pixel, calculating a magnitude of the enhanced wavelet coefficient $M_E$ by a first equation:

$$M_E=M_L+(a*M_M-b*M_S)$$

where a denotes a first adjusting parameter, and b denotes a second adjusting parameter;
for each pixel, determining the enhanced wavelet coefficient based on the calculated magnitude of the enhanced wavelet coefficient and the selected sign of the enhanced wavelet coefficient;
calculating a low frequency wavelet energy and a high frequency wavelet energy based on the determined enhanced wavelet coefficients;
converting the input color image into a gray image;
calculating a gray image energy of the gray image;
calculating an adaptive brightness control factor based on the low frequency wavelet energy of the enhanced wavelet coefficients, the high frequency wavelet energy of the enhanced wavelet coefficients, and the gray image energy;
performing an energy normalization based on the adaptive brightness control factor to normalize the determined enhanced wavelet coefficients;
applying an inverse wavelet transform to the normalized enhanced wavelet coefficients for the plurality of pixels to obtain a normalized enhanced grayscale image with adaptive brightness control;
splitting the input color image into a Y image, an U image, and a V image, wherein the Y image, the U image and the V image are color components in a YUV color space; and
combining the normalized enhanced grayscale image with adaptive brightness control with the U image and the V image to obtain a color enhanced image.

13. The method of claim 12, wherein for each pixel, the magnitudes of the red wavelet coefficient, the green wavelet coefficient, and the blue wavelet coefficient are obtained by taking absolute values of the red wavelet coefficient, the green wavelet coefficient, and the blue wavelet coefficient respectively.

14. The method of claim 12, wherein for each pixel, the magnitudes of the red wavelet coefficient, the green wavelet coefficient, and the blue wavelet coefficient are sorted in a descending or an ascending order before the step of categorizing the magnitudes of the red wavelet coefficient, the green wavelet coefficient, and the blue wavelet coefficient into the first magnitude, the second magnitude, and the third magnitude.

15. The method of claim 12, wherein the first adjusting parameter is equal to or larger than the second adjusting parameter, and the second adjusting parameter is equal to or larger than zero.

16. The method of claim 12, wherein the first adjusting parameter and the second adjusting parameter are equal to 0.5.

17. The method of claim 12, wherein the adaptive brightness control factor $\beta$ is calculated by a second equation:

$$\beta=1-((E_L+E_H)-E_G)/E_L$$

where $E_L$ denotes the low frequency wavelet energy of the enhanced wavelet coefficients, $E_H$ denotes the high frequency wavelet energy of the enhanced wavelet coefficients, and $E_G$ denotes the gray image energy.

* * * * *